Oct. 22, 1935.  E. F. PAWSAT  2,018,530
BICYCLE MUD GUARD BRACE
Filed April 28, 1934
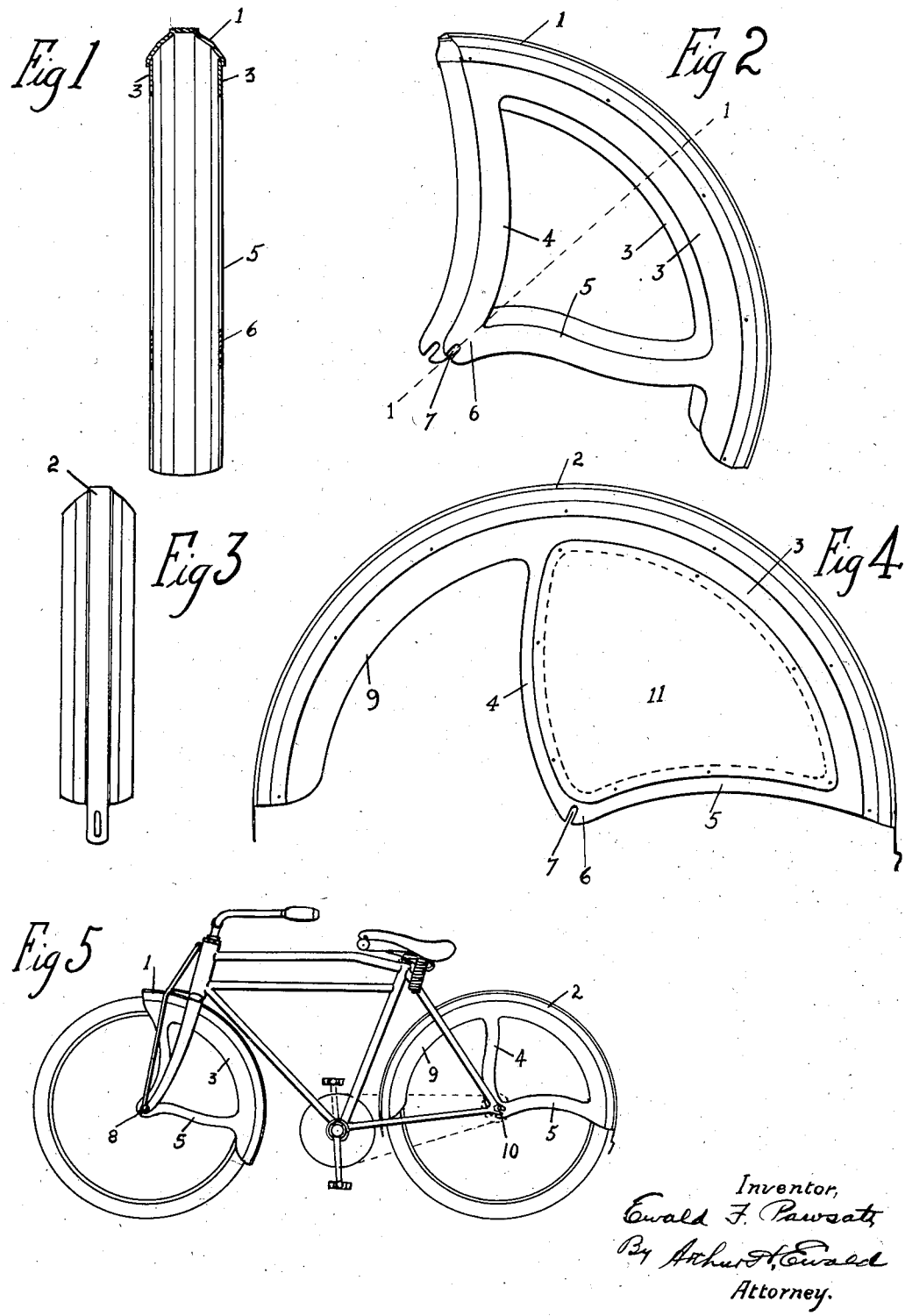
Inventor,
Ewald F. Pawsat,
By Arthur H. Ewald
Attorney.

Patented Oct. 22, 1935

2,018,530

UNITED STATES PATENT OFFICE 2,018,530

BICYCLE MUD GUARD BRACE

Ewald F. Pawsat, Maysville, Ky., assignor to Wald Manufacturing Company, Incorporated, a corporation of Kentucky Application April 28, 1934, Serial No. 722,953

2 Claims. (Cl. 208—141)

The present invention relates to braces or supports for the mud guards of bicycles and similar vehicles.

The principal object of the present invention is to provide an improved brace and support for a bicycle mud guard wherein arced members are provided which are adapted to be secured to the edges of the mud guard, said arced members being supported by webs consisting of arms converging into notched hub members adapted to engage the respective axles of the bicycle.

A further object of the present invention is to provide a mud guard brace which lends itself readily to advertising or similar display service.

Further objects of my invention will appear from the following detailed description thereof:

In the drawing:

Figure 1 is a section on line 1—1 of Figure 2.

Figure 2 is a perspective of a bicycle front mud guard provided with braces in accordance with this invention.

Figure 3 is an elevation of a rear mud guard provided with the new braces.

Figure 4 is a side elevation of the mud guard and braces of Figure 3.

Figure 5 is an elevation of a bicycle provided with mud guard braces constructed in accordance with the present invention.

The numeral 1 indicates the front mud guard of a bicycle and 2 the rear mud guard thereof. My new brace as provided for the front mud guard is made of two sections each consisting of an arced member 3, and a web having arms 4 and 5 converging in a hub element 6; the hub element 6 is notched at 7 to engage around the front axle 8 of the bicycle. Two such sections consisting of the parts just described are provided for the mud guard, the arced member 3 of one being secured to one edge of the mud guard, and the other being secured to the other edge of the mud guard.

As provided for the rear mud guard 2, the arced members 3 have forward extensions 9 integrally formed therewith. Otherwise, the rear braces are substantially similar to those provided for the front mud guard. In both cases the arced members are substantially coextensive with the mud guard to which they are to be secured. The arced members are secured to the edges of the mud guard by means of spot welding, bolts or rivets as may be preferred, or they may be integrally formed therewith.

The mud guard, when provided with my newly invented braces are secured to the vehicle in the manner clearly indicated in Figure 5, the notches 7 of the respective hub elements engaging respectively the front axle 8 and the rear axle 10 of the bicycle.

For purposes of advertising or other display, the opening formed between the arced members 3 and the arms 4 and 5 may be filled or covered by means of a plate 11 secured on the outer side of the arms 4 and 5 and the arced member 3, by bolts or otherwise. The surface thus provided may be supplied with any advertising or ornamental matter. Such surface may also be obtained by constructing the supporting web of unbroken or substantially unbroken area.

From the foregoing description, the nature and use of my invention will appear to those skilled in the art.

Various modifications of design as, for instance, the extension of the arced members, as well as in the construction of the supporting webs or arms and the manner of securing same, which might be by clamps or bolts, may be made without departing from the scope of my invention as defined in the appended claims.

Having thus fully described my invention, what I claim as new and desire to secure by Letters Patent is:

1. A brace for a mud guard comprising an arced member of substantially equal extension with said mud guard, the peripheral edge of said member being adapted to be attached to and to bear continuously against the lateral flange of said guard, a web, said web being integrally formed with said arced member and comprising a hub section, and a pair of arms diverging from said hub section at substantially right angles, said hub section being notched so as to engage an axle, whereby the brace may be secured to said axle by the ordinary axle nut.

2. A brace for a mud guard comprising an arced member of substantially equal extension with said mud guard, the peripheral edge of said member being adapted to be attached to and to bear continuously against the lateral flange of said guard, a web, said web being integrally formed with said arced member and comprising a hub section, a pair of arms diverging from said hub section at substantially right angles, said hub section being notched so as to engage an axle, whereby the brace may be secured to said axle by the ordinary axle nut, and a plate arranged to be secured between said web and arced member.

EWALD F. PAWSAT.